United States Patent
Christy et al.

(10) Patent No.: US 9,856,166 B2
(45) Date of Patent: Jan. 2, 2018

(54) PROCESS AND APPARATUS FOR SLAKING LIME AND DISSOLVING SCALE

(71) Applicant: RDP Technologies, Inc., Conshohocken, PA (US)

(72) Inventors: Richard W. Christy, Eagleville, PA (US); Michael Quici, Ambler, PA (US); Louis Litz, Ambler, PA (US)

(73) Assignee: RDP TECHNOLOGIES, INC., Conshohocken, PA (US)

( * ) Notice: Subject to any disclaimer, the term of this patent is extended or adjusted under 35 U.S.C. 154(b) by 0 days.

(21) Appl. No.: 14/703,401

(22) Filed: May 4, 2015

(65) Prior Publication Data

US 2015/0266775 A1    Sep. 24, 2015

Related U.S. Application Data

(62) Division of application No. 13/580,221, filed as application No. PCT/US2011/027109 on Mar. 4, 2011, now Pat. No. 9,023,312.

(Continued)

(51) Int. Cl.
| | |
|---|---|
| C04B 2/00 | (2006.01) |
| C04B 2/02 | (2006.01) |
| C04B 2/04 | (2006.01) |
| C04B 2/06 | (2006.01) |
| C04B 2/08 | (2006.01) |
| C02F 1/00 | (2006.01) |

(Continued)

(52) U.S. Cl.
CPC ............... *C04B 2/08* (2013.01); *C02F 1/529* (2013.01)

(58) Field of Classification Search
CPC .... C04B 2/00; C04B 2/02; C04B 2/04; C04B 2/06; C04B 2/066; C04B 2/08; C02F 1/66; C02F 1/685; C02F 1/687; C02F 2209/00; C02F 2209/005; C02F 2209/04; C02F 2303/00; C02F 2303/04; C02F 2303/22; C02F 1/00; C02F 1/68
See application file for complete search history.

(56) References Cited

U.S. PATENT DOCUMENTS

| | | |
|---|---|---|
| 2,904,401 A | 9/1959 | Booth |
| 3,511,600 A | 5/1970 | Kim |

(Continued)

FOREIGN PATENT DOCUMENTS

| | | | |
|---|---|---|---|
| JP | 06198127 A | * | 7/1994 |
| WO | 9636570 A1 | | 11/1996 |

(Continued)

OTHER PUBLICATIONS

Machine translation of JP 06-198127 A, which was published Jul. 19, 1994.*

*Primary Examiner* — Natasha Young
(74) *Attorney, Agent, or Firm* — Paul & Paul

(57) ABSTRACT

Process and apparatus is disclosed for providing a chemical reaction between calcium oxide containing grit particles to produce calcium hydroxide and heat, capturing the heat of hydration and using it to preheat water initially at ambient temperature, to rise to an elevated temperature to increase the amount of lime present in the water to a supersaturated lime suspension level, with the chemical reaction running to completion, followed by cooling. Heat from a water jacket may be used to raise the temperature in the lime slaker.

18 Claims, 4 Drawing Sheets

Related U.S. Application Data

(60) Provisional application No. 61/311,052, filed on Mar. 5, 2010.

(51) Int. Cl.
*C02F 1/66* (2006.01)
*C02F 1/68* (2006.01)
*C02F 1/52* (2006.01)

(56) References Cited

U.S. PATENT DOCUMENTS

| | | |
|---|---|---|
| 3,886,064 A | 5/1975 | Kosonen |
| 3,969,094 A | 7/1976 | Dunson, Jr. et al. |
| 4,064,744 A | 12/1977 | Kistler |
| 4,166,997 A | 9/1979 | Kistler |
| 4,261,953 A | 4/1981 | Gisler |
| 4,454,770 A | 6/1984 | Kistler |
| 4,482,528 A | 11/1984 | Emmett |
| 4,539,024 A | 9/1985 | Stehning et al. |
| 4,588,559 A | 5/1986 | Emmett |
| 4,741,896 A | 5/1988 | Thomas, Sr. |
| 4,779,992 A * | 10/1988 | Underwood ............ B01F 5/104 366/137 |
| 5,013,458 A | 5/1991 | Christy, Sr. et al. |
| 5,094,752 A | 3/1992 | Davis et al. |
| 5,217,625 A | 6/1993 | Khan et al. |
| 5,229,011 A | 7/1993 | Christy, Sr. et al. |
| 5,292,353 A | 3/1994 | Kaufman et al. |
| 5,313,022 A | 5/1994 | Piroozmandi et al. |
| 5,336,481 A | 8/1994 | Muzik et al. |
| 5,346,616 A | 9/1994 | Christy, Sr. et al. |
| 5,368,731 A | 11/1994 | Pesotini |
| 5,401,402 A | 3/1995 | Christy et al. |
| 5,405,536 A | 4/1995 | Christy |
| 5,433,844 A | 7/1995 | Christy |
| 5,554,279 A | 9/1996 | Christy |
| 5,573,656 A | 11/1996 | Santos |
| 5,618,442 A | 4/1997 | Christy |
| 5,647,996 A | 7/1997 | Yablonsky et al. |
| 5,746,983 A | 5/1998 | Stephansen |
| 5,770,823 A | 6/1998 | Piroozmandi |
| 5,783,073 A | 7/1998 | Christy et al. |
| 5,895,763 A | 4/1999 | Edstrand et al. |
| 6,033,577 A | 3/2000 | Braband et al. |
| 6,092,301 A | 7/2000 | Komanowsky |
| 6,296,761 B1 | 10/2001 | Scheuerman, III |
| 6,568,842 B1 | 5/2003 | Murray |
| 7,024,800 B2 | 4/2006 | Gorbell et al. |
| 7,048,900 B2 | 5/2006 | Mathur et al. |
| 7,416,673 B2 | 8/2008 | Christy et al. |
| 7,669,348 B2 | 3/2010 | Christy et al. |
| 7,685,737 B2 | 3/2010 | Gorbell et al. |
| 8,065,815 B2 | 11/2011 | Christy et al. |
| 8,153,088 B2 | 4/2012 | Stephansen |
| 2003/0051841 A1 | 3/2003 | Mathur et al. |
| 2004/0175324 A1 | 9/2004 | Hassibi |
| 2006/0231507 A1 | 10/2006 | Christy et al. |
| 2006/0231511 A1 | 10/2006 | Christy et al. |
| 2007/0056902 A1 | 3/2007 | Kelly |
| 2007/0281059 A1 | 12/2007 | Smith |
| 2008/0057555 A1 | 3/2008 | Nguyen |
| 2008/0185324 A1 | 8/2008 | Christy et al. |
| 2010/0196258 A1 | 8/2010 | Stephansen |
| 2011/0039318 A1 | 2/2011 | Lehr |
| 2011/0089115 A1 | 4/2011 | Lu |
| 2014/0034582 A1 | 2/2014 | Christy et al. |
| 2014/0175026 A1 | 6/2014 | Christy et al. |
| 2015/0203386 A1* | 7/2015 | Christy ............... C04B 2/04 423/640 |

FOREIGN PATENT DOCUMENTS

| | | |
|---|---|---|
| WO | 2006113176 A2 | 6/2006 |
| WO | 2008045857 A2 | 8/2008 |
| WO | 2008123778 | 10/2008 |

\* cited by examiner

PROCESS AND APPARATUS FOR SLAKING LIME AND DISSOLVING SCALE

CROSS-REFERENCE TO RELATED APPLICATIONS

This application is a division of U.S. application Ser. No. 13/580,221, now U.S. Pat. No. 9,023,312, filed Aug. 21, 2012, which is based on International application no. PCT/US2011/027109, now WO/2011/109669, filed Mar. 4, 2011, which claims the priority of provisional application Ser. No. 61/311,052, filed Mar. 5, 2010.

THE PRESENT INVENTION

The present invention is directed to a process and apparatus for treating waste water, sewage sludge and/or purifying drinking water via a lime slaking process, and a process and apparatus for dissolving scale that forms on internal surfaces of a lime slaker and related equipment, including an aging tank and a grit separation device, by introducing an acid into the system.

BACKGROUND OF THE INVENTION

Lime has been used in the treatment of sewage sludge to remove pathogens, lime stabilization of waste water, pasteurization of sludge and purification of drinking water by adjusting the pH of the water. Examples of such processes involving the use of lime can be found in U.S. Pat. Nos. 5,013,458; 5,229,011; 5,346,616; 5,401,402; 5,405,536; 5,433,844; 5,554,279; 5,618,442; and 7,416,673, which contents are incorporated herein by reference.

Calcium oxide (CaO), is mixed with water ($H_2O$) to form calcium hydroxide ($Ca(OH)_2$). The chemical reaction which occurs during such mixing gives off heat in the form of an exothermic reaction. When this reaction is done in the presence of excess water it is commonly referred to as lime slaking. This process is accomplished in a device known as a lime slaker. The resulting mixture of $Ca(OH)_2$ and water is known as a lime slurry. Lime slurries are known to have some unique properties, one of which is an inherent ability to form scale on surfaces which come into contact with the lime slurry. The formation of scale, or "scaling" can render the various delivery systems, such as pipes, troughs, conduits, etc. unusable over time due to the build-up of scale. Accordingly, such scale build-up requires frequent cleaning and descaling of the equipment that is used to handle lime slurries. Cleaning and descaling operations can be considerably labor and cost intensive.

Lime slurries also contain a certain amount of inert material that is commonly referred to as grit. Grit results because the lime contains a certain amount of material other than calcium oxide (CaO). Typically, lime contains approximately 90%-95% CaO, and 5%-10% inert material, or grit. Quicklime is more than 92% pure.

The presence of grit in a lime slurry can cause numerous problems, including grit build-up in downstream process chambers or vessels, grit acting to plug or clog nozzles or any orifices through which the slurry passes, and abrasions caused to treatment equipment and slurry delivery equipment such as pumps, pipes, valves, etc. because of the abrasive nature of grit particles.

Various techniques have been attempted for separation of unwanted grit that is contained within a lime slurry.

U.S. Pat. No. 4,482,528 describes some of the problems that are encountered when trying to separate unwanted grit from a lime slurry. Using a gravity classifier to separate grit from a lime slurry when discharging from a lime slaker is described as being unable to effectively remove particles smaller than 100 mesh (140 microns).

The gravity separation of grit, directly after the slaking of lime in a lime slaking device, can be problematic, in that the amount and size of the grit removed will vary as the rate of discharge from the lime slaker varies. At high discharge rates from the slaker, the slurry will have less retention time in the grit separation chamber, which can be insufficient for the smaller grit particles to settle, such that the grit particles can be conveyed through the separation chamber and into the finished lime slurry, resulting in inconsistent and highly variable amounts of grit removal.

U.S. Pat. No. 4,482,528 attempts to improve upon gravity separation of grit by the use of a cyclone followed by at least one gravity classifier device. The cyclone operates centrifugally, and removes grit and lime, which discharges from the cyclone into a gravity classifier, wherein dilution water is added in order to allow the grit to settle in the classifier.

U.S. Pat. No. 5,746,983 describes an apparatus and method for the slaking of lime which includes a process under constant supervision. The calcium oxide is delivered to the lime slaker and mixed with ambient water through a conveyor which delivers the quicklime at distinct intervals by means of a mixer. The apparatus uses load cells to measure the weight of the lime and/or water. The apparatus and method can be run on small quantities of lime and in batches. This invention is designed to enable non-continuous operation in intervals, and an attempt to limit maintenance on operating systems.

Accordingly, a need remains to provide a method for producing a high-quality supersaturated lime suspension which can be continuously and automatically delivered in precise and variable dosages with little or no supervision and a method for automatically removing scale build-up.

SUMMARY OF THE INVENTION

This invention provides a method of and apparatus for producing a high-quality supersaturated lime suspension for use in lime slaking processes comprising mixing lime containing CaO and grit particles and pre-heated water that is above ambient water temperature in a lime slaker to form a supersaturated lime suspension, cooling the supersaturated lime suspension, and delivering the supersaturated lime suspension to a separation device which separates grit particles from the supersaturated lime suspension, thereby recovering a high-quality supersaturated lime suspension. An automated system comprising the method steps of this method is also an object of this invention.

As used herein, "supersaturated lime suspension" (SLS) is defined to include either lime particles dissolved in water or a suspension of small lime particles in water.

In addition, an acid wash system is provided which comprises an automated method and apparatus for removing scale build-up in a lime slaker, a lime slurry aging tank, and/or a delivery system comprising monitoring scale build-up in the lime slaker, the lime slurry aging tank, and/or the delivery system; and at a pre-determined set point of scale build-up or time, delivering an acid wash solution to the lime slaker, the lime slurry aging tank, and/or the delivery system, thereby dissolving the scale build-up.

BRIEF DESCRIPTIONS OF THE DRAWINGS FIGURES

DETAILED DESCRIPTIONS OF THE PREFERRED EMBODIMENTS

Figure 1:
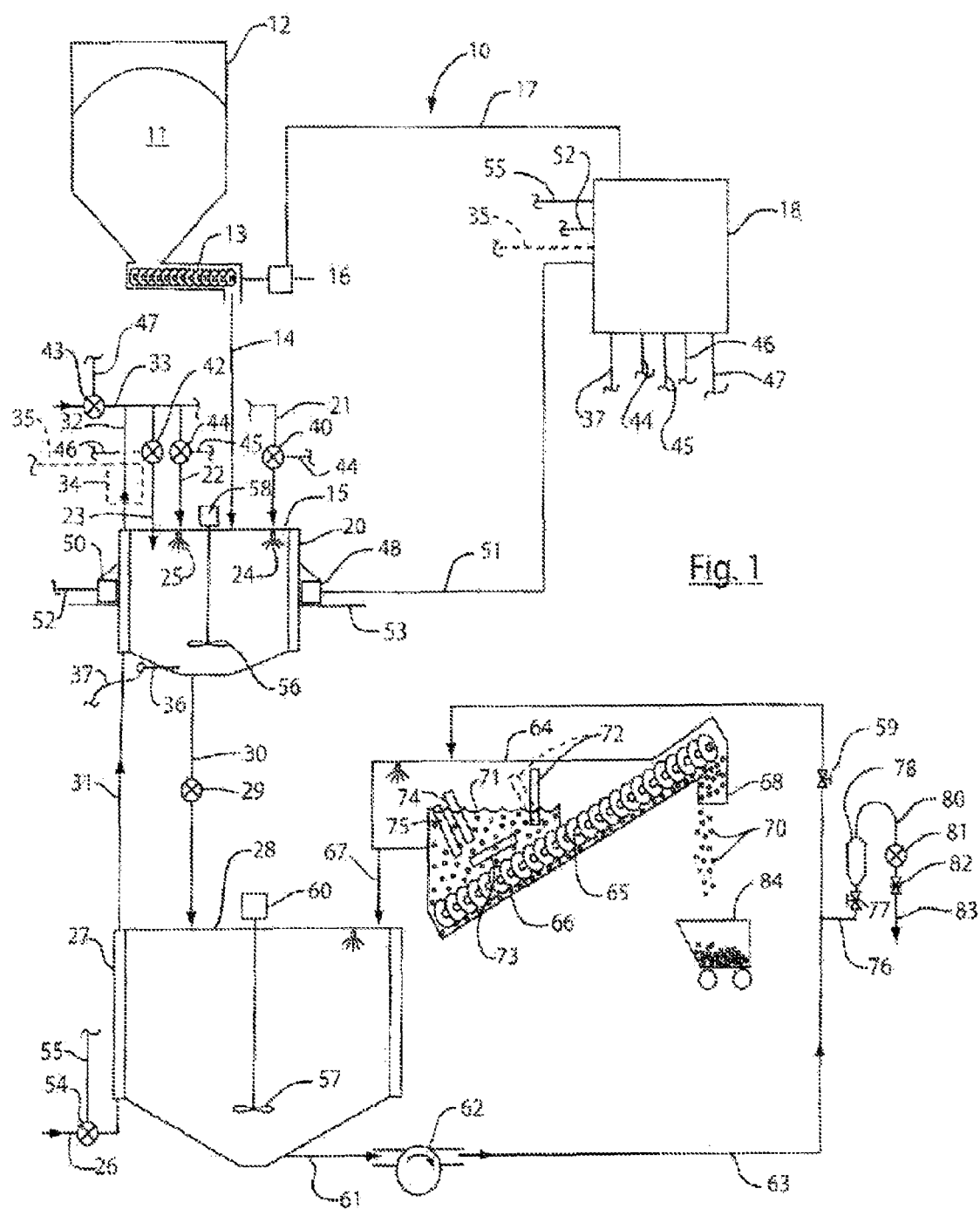
FIG. 1 is a schematic of the system and method for producing high quality SLS according to the invention.

First, it will be noted that in FIG. 1, the lime slaking system and its components are principally illustrated, along with an aging tank and grit classifier, with various sensors, controls and delivery lines.

Figure 3:
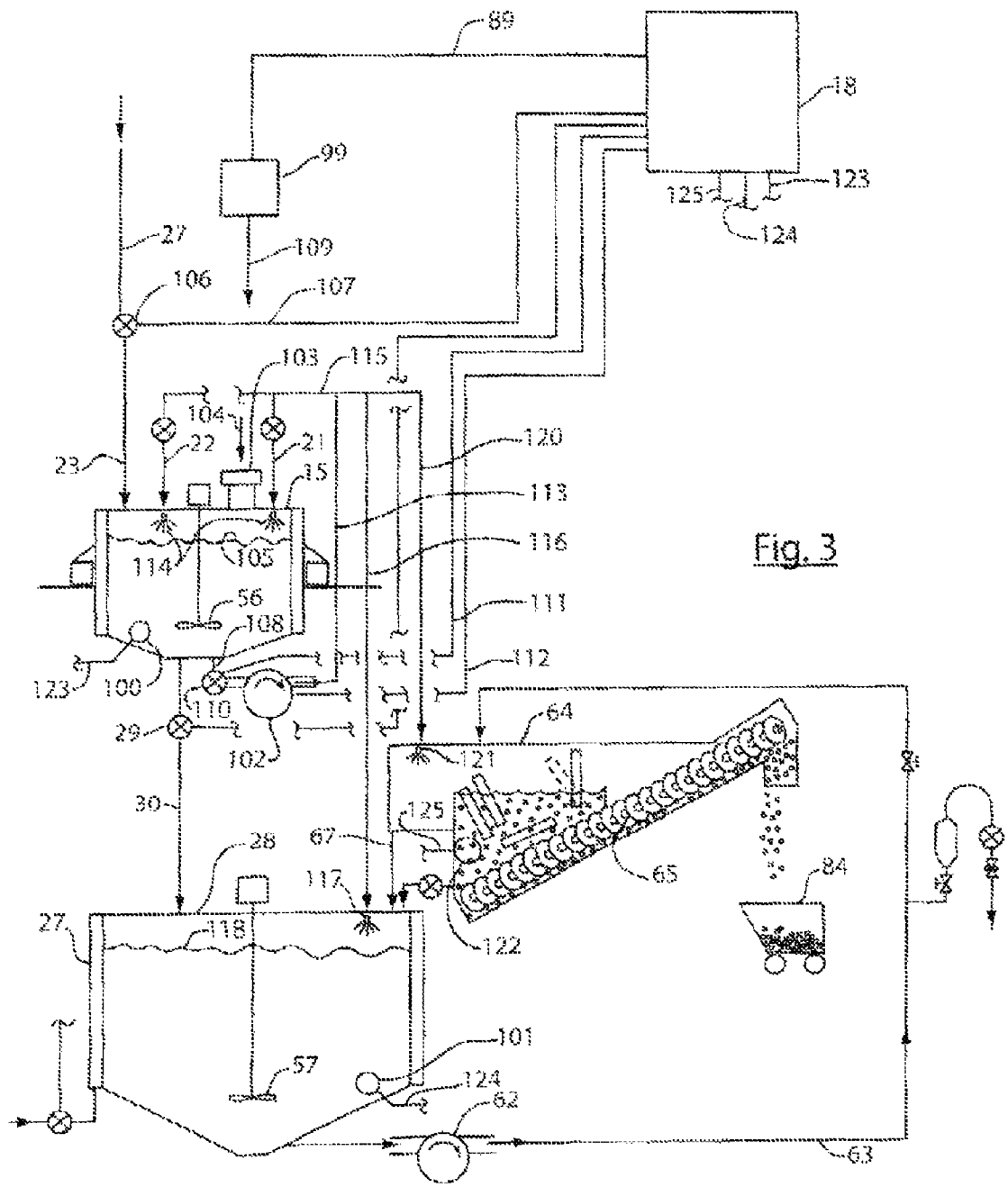
FIG. 3 is a schematic of the acid wash system in accordance of this invention, whereby scale is removed from the various components of the system.

In FIG. 3, many of the same components as are illustrated in FIG. 1 are also illustrated, but wherein FIG. 3 emphasizes the acid wash system, its sensors and controls. It will be understood that the system of this invention can be and preferably is a combination of that which is illustrated in each of FIGS. 1 and 3, but that, for simplicity of presentation and ease of understanding, FIG. 1 is principally directed to the lime slaking system and related components, whereas FIG. 3 is principally directed to the acid wash system and related components.

Figure 2:
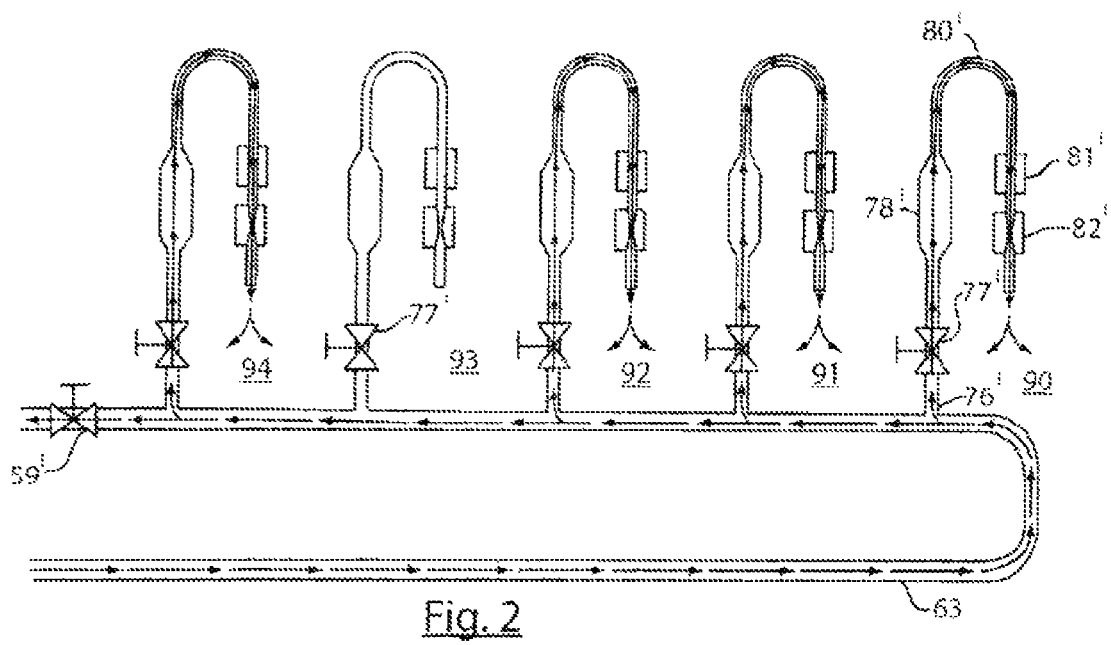
FIG. 2 is a schematic fragmentary view of a multi-point precision dosing arrangement, wherein the SLS of slurry from a slurry loop pump delivers SLS to a plurality of dosing locations, which can be at different dosing rates as the slurry is pumped to a grit classifier.

In FIG. 1 there is illustrated a system that comprises apparatus and method to automatically and continuously deliver precise doses of high quality SLS and in FIG. 2, the doses are shown to be delivered at a plurality of locations. In the system as illustrated in FIGS. 1 and 2, the operating system is capable of functioning with little or no operator attention, input, or routine maintenance.

In FIG. 1, the system is generally designated by the numeral 10. Lime 11 is present in a lime storage silo 12 and is delivered via a delivery auger, conveyor or other delivery device 13 via a suitable delivery line 14, to a lime slaker 15. The operation of the delivery device 13 may be controlled by a suitable preferably electric motor 16 that in turn, is automatically activated via a control line 17 from a programmable logic computer 18.

The lime 11 in the lime storage silo 12 includes grit particles. In the lime slaker 15 pre-heated water is introduced at about 10°-20° F. or more over the temperature of ambient water, in order to form a SLS. The ambient water may be at any temperature that is available to the facility in which the slaking process takes place. The lime is essentially calcium oxide, and when it is mixed with water in the slaker 15, a chemical reaction occurs, in which calcium hydroxide and heat are produced during an exothermic reaction.

The lime slaker 15 is provided with a water jacket 20 around its exterior. The water jacket 20 is adapted to receive water via any of water delivery lines 21, 22 and/or 23. Lines 21 and 22 deliver water into the lime slaker 15 via spray nozzles 24, 25 respectively. Line 23 may deliver water into the lime slaker 15 either through spray nozzle(s), or via any delivery means, as may be desired.

The ambient water is provided, preferably, via line 26, which passes through a water jacket 27 that is disposed around a slurry aging tank 28. The slurry aging tank 28 receives lime slurry from the lime slaker 15, via delivery line 30. The discharge of water from the water jacket 27 of the aging tank 28 is via line 31, to the water jacket 20 of the lime slaker 15, delivering water through the water jacket 20, to line 32, to line 33, and then into the lime slaker 15 via the line 23.

Initially, the ambient water delivered to the lime slaker 15 via lines 26, 31, 32, 33 and any of 21, 22 and 23 and the water would be at the ambient temperature. However, as soon as the exothermic reaction begins to occur in the lime slaker 15, the heat of hydration is captured in the lime slaker water jacket 20, and then begins to pre-heat the water passing into the lime slaker 15 via lines 32, 33 and any of 21, 22 and 23. The process continues, gradually increasing the temperature of the water delivered to the lime slaker as the reaction runs to completion, forming a SLS in the lime slaker 15. If desired, at the commencement of the lime slaking process, before water in the water jacket 20 of the lime slaker 15 has increased in temperature in any substantial amount, the water entering the lime slaker via any of lines 21, 22 and/or 23 may be pre-heated via an electric or other heating device shown in phantom at 34, around water line 32 with the control of the heating device 34 being done via a control line 35, being turned on and off as desired by the programmable logic computer 18 as directed by a temperature sensing device 36 in the lime slaker 15, that, in turn, is connected to the programmable logic computer 18 via a sensing line 37. Thus, when a desired predetermined temperature is reached in the like slaker 15, the computer 18 may de-activate the electric or other heating device 34. It will be understood that the lime delivery conveyor 13 can be a volumetric feeder device, the control of which is via motor 16 as dictated by the computer 18.

The water that is delivered to the lime slaker 15 via lines 21, 22 and 23 can be controlled by suitable valves 40, 41, 42 and 43 that are also controlled from the computer 18, via respective control lines 44, 45, 46 and 47.

The lime slaker 15 may sit on a plurality of load cells 48, 50, that in turn support the lime slaker 15 on a floor 53, with the load cells 48, 50 being connected to the computer 18 via signal lines 51 and 52, so that the computer 18 can automatically control the inflow of water and lime into the lime slaker 15, by controlling the lime feeder motor 16 and the various water supply valves 40-43. The computer 18 can also control the flow of water to the water jacket 21 of the aging tank 28, by controlling the operation of valve 54 via control line 55. The lime that is introduced via feeder device 13, into the lime slaker 15 will preferably be quicklime which has viewer grit particles therein than some other types of lime.

The load cells may be constructed as are the load cells in U.S. Pat. No. 7,669,348, or any one or more of U.S. Pat. Nos. 5,770,823; 4,064,744; 4,166,997; 4,454,770 and 5,313,022, the complete disclosures of which are herein incorporated by reference.

The lime slaker 15 can be of any desired type capable of accomplishing the ends of this invention, including lime slakers as disclosed in U.S. Pat. Nos. 2,904,401; 5,368,731; 4,261,953 and/or 4,482,528, the complete disclosure of which are herein incorporated by reference.

It will also be understood that the lime slaker 15 and the aging tank 28 are provided with suitable respective mixers 56, 57, motor driven at 58, 60 respectively.

The SLS that is delivered into the aging tank via line 30 is cooled by water entering the water jacket 27 of the aging tank 28 via line 26, in that the water provided via line 26 is at an ambient temperature.

The pre-heated water as described above as being about 10°-20° F. above the ambient water temperature can have some variation in its temperature, in that, as used herein "about" means plus or minus about 10%, unless indicated otherwise. It will be understood that ambient water temperature can vary by location and season.

While it has been described above that any electric or other heating system 34 may be used, initially, to begin to pre-heat water introduced into the lime slaker 15, to heat the water used in the initial reaction, it will be understood that, thereafter, the system 10 of this invention will rely upon capturing the heat from the exothermic reaction, and/or from the cooling that is provided via the water jacket 27 of the aging tank 28. Also, it will be understood that the cooling step can be performed in the lime slaker by dilution, by providing cooling water into the slaker 15 via any of lines 21, 22 and 23. Also, alternatively, or in conjunction therewith, the cooling of the SLS in the lime slaker 15 can be accomplished by transferring heat from the SLS that is in the lime slaker 15, to the water jacket 20. Thus, the cooling step can be the addition of ambient water to the SLS, or the use of water jackets 20, 27, or combinations thereof.

The system 10 also includes a discharge line 61 from the slurry aging tank 28, which discharges to the inlet or suction side of a pump 62, which in turn, delivers the slurry via line 63, to a separation device 64, that is of the gravity operative grit classifier type. The separation device 64 comprises a tank with a sloped auger 65 which conveys grit up a slope 66, which grit has become separated from the liquid 71 in the tank 64, in that the lower end of the auger 65 is immersed in the liquid therein, and operates to engage the grit particles and convey them up the sloped surface to be discharged at 68. The separation device 64 can be either external to or integral with the lime slurry aging tank 28. The auger conveys the grit 70 out the discharge 68 thereof, into a dumpster 84 or other removable discharge unit.

Prior to delivering slurry via line 63 to the separation device 64, a portion of the SLS can be extracted at line 76, through a valve 77, through a grit trap 78, then via line 80, through a magnetic flowmeter 81 and pinch valve 82, to a dosing location thereunder, at 83.

Figure 1A:
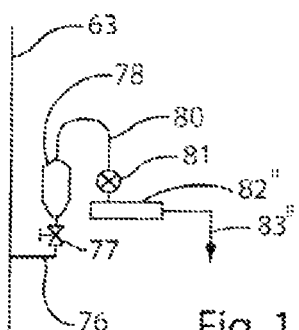
FIG. 1A is a schematic illustration of a portion of FIG. 1, which represents an alternative to the delivery of lime slurry to a dosing location, relative to that illustrated in FIG. 1, in which a metering pump is used lieu of a pinch valve.

FIG. 1A illustrates in schematic form, in which SLS is extracted from line 63, via line 76, through a valve 77, through a grit trap 78, and then via line 80 through a magnetic flowmeter 81 and a metering pump 82" that is used in lieu of the pinch valve 82 of FIG. 1, to a dosing location thereunder, at 83". The pump 82" uses positive displacement to push the flow of slurry to the dosing location 83". This arrangement is successfully done when one is dosing to an application point 83" that is under pressure, and wherein the pressure is higher than the pressure in the loop 63, so that the pressure in the loop 63 can overcome the pressure at the application point 83". The particular metering pump 82" could be selected in size to overcome the pressure at location 83".

Figure 2A:
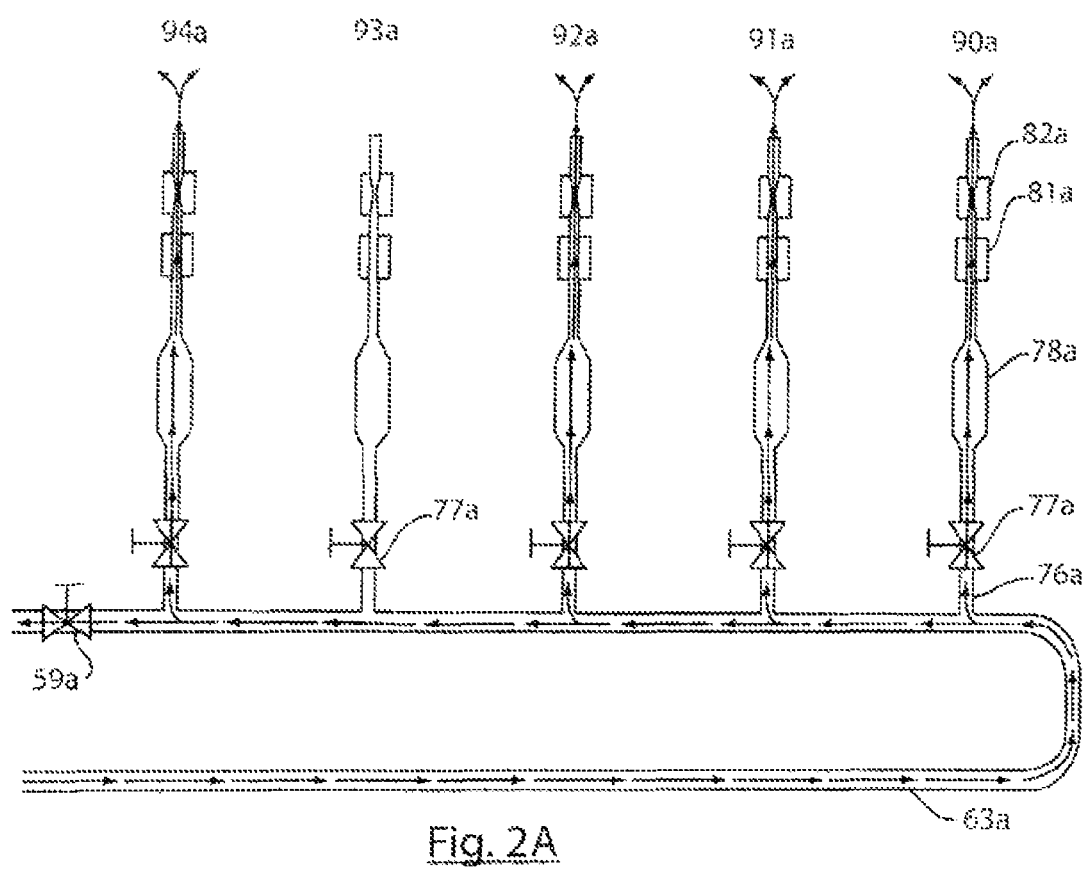
FIG. 2A is an illustration similar to that of FIG. 2, but wherein the dosing locations differ from those of FIG. 2, in that there is not a reverse bend in the line between the grit traps and flowmeters.

In FIG. 2A, the dosing locations 90a, 91a, 92a, 93a and 94a are shown extending in a generally straight lines commencing at 76a, through valves 77a, through grit traps 78a, through magnetic flowmeters 81a and pinch valve 82, to their respective locations, as an alternative arrangement to that illustrated in FIG. 2.

In FIGS. 2 and 2A, respective valve 59' and 59a can be applied to substantially close the dosing loops 63, 63a to atmosphere, by adjusting the valves 59' or 59a to maintain a relatively constant pressure, to create a back pressure from the aging tank 27 of FIG. 1, through delivery line 61, pump 62, delivery line 63, and to the dosing arrangement commencing at line 76 of FIG. 1, or to the dosing arrangements of FIGS. 2 and 2A. In FIG. 1, the valve 59 could, optionally, create a similar back pressure, as may be desired.

The separation device 64 may have one or more baffles in the form of laminar flow plates 72, 73, 74 and 75, one or more of which may be adjustable, as indicated for the baffle plate 72 between the full line and phantom line positions thereof, for facilitating separation of grit from SLS in the separation device 64.

The extraction of a portion of the SLS from aging tank 28 can be performed more than once on the SLS by returning the SLS from the separation device 64 via line 67, back to the aging tank 28.

The separation device 64 may be provided with a movable wall and associated electric or pneumatic activation drives in accordance with U.S. Pat. No. 7,416,673, and the separation device 64 may be constructed in accordance with the separation devices of any of U.S. Pat. No. 7,416,673 and U.S. patent publication 2008/0185324 published Aug. 7, 2008 and/or published application 2006/0231507 published Oct. 19, 2006, the complete disclosures of which are all herein incorporated by reference. If a movable wall is provided for the separation device 64, such may enable one to vary the cross-sectional surface area of the device 64, which will cause an automatic variation in the volume of the liquid contained within the separation device 64. The return of the SLS back to the aging tank 28 via line 67 enables further purification and grit removal.

As described above, the lime slaker 15 can be mounted on one or more load cells or weighing cells for weighing the contents thereof; namely the lime and water. Load cells are electronic weighing devices that add a precise quantity of water to a known quantity of quicklime to optimize the chemical reaction and indicate the amount of SLS which is contained in the lime slaker 15. The amount of lime and water to be added to the lime slaker 15 can also be determined by volumetric or gravimetric means. The lime slaker 15, as described above, has a motor equipped mixer 56, which can be controlled remotely and automatically. The lime slaker 15 is sized to allow the solid-liquid phase slaking reaction to run until the slaking reaction is complete and the slaking temperature is reached. The slaking temperature is defined as the point in time when the exothermic reaction has stopped and the temperature is no longer increasing, and is at least 3 minutes after the end of lime addition from the lime storage silo 12. The lime slaker 15 of this invention is capable of processing the specified quantity of lime and is designed to operate within 50° F. of a predetermined temperature set point, which is selected to be in the range of about 176°-212° F., and more preferably within the range of 180°-195° F., automatically adjusting to changes in the initial water temperature and variations in lime quality without the need for operator input.

After the slaking reaction is completed, the lime slurry can be diluted to a predetermined concentration set point selected within the range of about 5%-25%, or in the range of 10% to 20%, utilizing the direct weight measurement of lime and water via the load cells. The slurry concentration is within + or −0.5% of the set point (i.e. 9.5%-10.5% for a 10% slurry concentration setting).

As the system runs through several slaking cycles, the preheated water is maintained at a temperature higher than the original ambient water and the ambient water used in the cooling step. This optimizes slaking by starting at a temperature above the initial water temperature.

The lime slurry aging tank 28 can be provided with an access cover at its upper end (not shown). The access cover can be gasketed to contain steam and dust. The bottom of the tank 28 can include a flange connection for the slurry pump 62 (not shown). Also, a separate drain opening can be provided for maintenance and cleaning of the lime slurry aging tank 28, also not shown. The motor 60, as with the motor 58 for the lime slaker can include a speed reducer, which speed reducer can be grease lubricated and directly connected to the mixer shaft assembly.

The slurry pump 62 for delivering slurry from the aging tank 28 to the separation device 64 can be selected in size to provide a desired velocity through a conduit so that the grit particles and the lime particles do not settle within the conduit 63. The selected velocity of flow through all conduits of the invention also provides a scouring action from entrained grit particles, which helps keep the conduits from clogging due to build-up of scale within the conduits. The slurry pump 62 can also contain seals that are self-sealing and require no water, as well as a high pressure switch. The separation device 64 allows for a small quantity of grit particles to remain in the SLS to assist the scouring action and prevention of scale build-up.

An example of the method of the invention is as follows: An initial reaction is run where a pre-determined amount of lime containing CaO and grit particles and ambient water is delivered to the lime slaker 15 which is mounted on load cells. The optimal processing temperature is used to produce the best particle size through precise adjustment of the reaction water and lime ratio. The load cells also allow for making precise adjustments to maintain the optimal temperature and compensate for changes in lime or water characteristics. Depending on the quality of lime used, the reaction will need more or less time to complete, but will generally take about 3-20 minutes. The reaction is allowed to run to completion to allow all the lime to be converted.

Ambient water is added to cool the SLS in order to keep the lime in solution as calcium hydroxide more effectively. Diluting the SLS minimizes downstream scaling as well. After the cooling step, the cooled SLS is delivered to the lime slurry aging tank 28 which is capable of holding two or more batches of SLS from the lime slaker 15. The lime slurry aging tank 28 gradually and continuously delivers the SLS to the separation device 64 where grit is separated from the SLS and removed by means of the slurry pump 62 and via the lime slurry loop 63.

The SLS is then recycled into the lime slurry aging tank 28 and run through the separation device 64 as many times as desired.

The system can also use fine grit classifier hydraulic separation to deliver a high-quality SLS with minimal grit particles. Considering that the specific gravity of grit is approximately three times that of water, 2.65 versus 1.0, grit particles settle at a predetermined rate and adjusting the "rise rate" of the water allows for a precise separation to be made. For example, if grit settles at 3 feet per minute, then the rise rate of water can be set at 2 feet per minute. This hydraulic separation principle is used to keep the grit in the grit trap 78. Dosing of the high quality SLS can also occur at multiple points along the lime slurry loop 63.

With reference now to FIG. 2, there is provided a schematic illustration of the manner in which the lime slurry loop 63 between the aging tank 28 and grit separator 64 can deliver dosing to any of a plurality of locations, even at different rates. It will be seen that the delivery loop 63 receives slurry in the direction of the arrows, and delivers the same to any of a plurality of dosing locations in a multi-dosing location arrangement. Such dosing locations are indicated by the numerals 90, 91, 92, 93 and 94. It will be understood that any number of such dosing locations may exist on the loop 63.

As with the dosing described above with respect to FIG. 1, each of the dosing locations includes a line 76', a valve 77', a grit trap 78', an exit line 80', a magnetic flow meter 81' and a pinch valve 82'.

In the illustration of FIG. 2, the dosing apparatus for location 93 is out of service, because the valve 77' for that location 93 is in the closed position, in order to illustrate that not all dosing locations need to be operative at any given time. The other dosing locations may deliver precise dosing at varying rates. For example, one dosing location may be delivering 9.5 gallons per minute, for example, at dosing location 94, whereas dosing location 92 may be delivering 10.2 gallons per minute, with dosing location 91 delivering 9.7 gallons per minute, and dosing location 90 delivering 10.9 gallons per minute. It will be understood that substantial variation may be provided in the dosing rates, depending upon the desires of an operator.

It will be understood that with respect to the above description of FIGS. 1 and 2, there is provided a method and apparatus for creating a SLS for delivering high quality SLS in which the process water is preheated prior to introduction into the slaking tank through a single or two step process, wherein the heat of hydration is used for preheating water required for a hydration reaction to occur at elevated temperatures between 176° F. and 212° F. This is followed by a second step to reduce the amount of lime that precipitates by cooling of the previously heating lime solution. The operating system is based on developing an algorithmic operating control system set point by developing a formula to calculate the required quantity of water required to achieve a time/temperature profile suitable to produce a SLS. The characteristics are optimized by adjusting the amount of water that is added to the mixture based upon the temperature of the incoming water and the predetermined hydration reaction temperature. The amount of heat extracted is maximized by allowing the reaction to run to completion before the next batch is initiated. The heat of reaction is used to preheat the water for the subsequent batch. Thus, the temperature of the process water is raised by capturing the heat of hydration and by transferring that heat into elevating the temperature of the process water. In order to keep the lime particles in suspension in the water, the reaction is allowed to run to completion, and then the mixture is cooled, preferably by adding ambient water, with the mixture then being aged in a separate slurry aging tank, followed by cooling of the mixture/solution in a slurry aging tank via the water jacket 27.

This invention also provides an automated system for automatically and continuously delivering a dosage of high-quality SLS, preferably in batches, comprising automating the steps of the methods described herein.

The system of this invention can be fully automatic and demonstrates the ability of the lime slaker 15 to allow the solid-liquid phased slaking reaction to run until completion, at a predetermined temperature, and then dilute to a predetermined slurry concentration. The system of the invention can be equipped with a control panel which provides a method of recording the time and slaking temperature. A chart can be generated for each batch showing time and temperature for the complete duration of the batch. At completion, the data can be printed and read to ensure compliance with all requirements of the system including the initial water temperature, weight of lime per batch, weight of water per batch, final slaking temperature and time required to reach that temperature, and weight of cooling water per batch. This allows for automatically setting or resetting the amount of lime and water added to the lime slaker 15.

The above-described method can further comprise the step of dissolving scale buildup in the lime slaker 15 or the lime slurry aging tank 28 by performing an acid wash after the high-quality SLS is recovered. An example of an acid wash system of this invention is illustrated in FIG. 3.

Referring to FIG. 3, this invention also provides a method for removing scale buildup in a lime slaker 15, a lime slurry aging tank 28, or any delivery system comprising (a) monitoring scale build-up in the lime slaker 15 via monitor 100, the lime slurry aging tank 28 via monitor 101, and/or the delivery system including the separation device 64 via the monitor 122; and (b) at a pre-determined set point of scale buildup or time, delivering an acid wash solution to the lime slaker 15, the lime slurry aging tank 28 and/or the delivery system by use of an acid wash pump 102, thereby dissolving the scale build-up.

The acid is placed into the lime slaker 15 through an inlet 103 thereof, in the direction of the arrow 104, either manually or automatically. If automatically, the computer 18, acting in response to one or more scale build-up monitors 100, 101 and 122, through control line 89, discharges acid from acid supply 99 through supply line 109 to inlet 103. The acid enters the lime slaker 15 above the liquid level 105 thereof. Water is delivered via line 27, as needed, into the lime slaker 15, depending upon the operation of a valve 106, controlled either manually, or from the computer 18 via control line 107. As acid enters the lime slaker 15, it is extracted after mixing with liquid therein, via line 108, upon opening of the valve 110 at the bottom thereof, which valve 110 can be controlled from the computer 18 via control line 111, and then the pump 102, activated via control line 112 from the computer 18, or manually, can deliver the acid/water solution back into the lime slaker 15 via line 113, 115, lines 21 and/or 22 to the spray nozzles 114 that are disposed above the liquid level 105, in order to expose the entirety of the lime slaker 15 to the acid wash. The acid rinse line 113 also delivers the acid rinse to the aging tank 28 via lines 115 and 116, to enter the aging tank 28 via one or more spray nozzles 117 therein, also located above the liquid level 118 thereof. Similarly, the acid wash is delivered to the separation device 64 by means of the pump 102, through line 113, line 115 and line 120, to enter the separation device 64 through one or a plurality of spray nozzles 121. Then, the generally continuous recirculation of the acid rinse from aging tank 28, via pump 62, delivery line 63, and back into the separation tank 64, then back into the aging tank 28 via line 67, continues the recirculation of the acid wash. The monitors 100 in the slurry tank 15, 101 in the aging tank 28, and 122 in the separation device 64, can continually monitor the level of scale build-up in those vessels, and can communicate via signal lines 123, 124 and 125, respectively, to signal to the computer 18 when it is necessary to provide the acid rinse described above to the various equipment in the system. Then, the acid wash can be implemented manually or automatically.

When the monitoring step and delivering step are performed in the lime slaker 15, this method can further comprise the step of discharging the acid wash solution from the lime slaker 15 to the lime slurry aging tank 28 and any other part of the system. In addition, this method can further comprise the step of adding a SLS to elevate the pH of the acid wash solution. This enables the system to be ready for more slaking.

The acid wash system of the invention can be applied to the lime slaker 15, lime slurry aging tank 28, or any other part of the system. Spray nozzles can be positioned to be above the liquid level so that the nozzles delivering lime and water can be cleaned during the acid wash cycle. At least two spray nozzles can be installed in a vessel to maximize the coverage of the acid wash spray. The spray nozzles 114 can be eliminated, and water could be delivered directly into the lime slaker 15 via lines 21, 22, in order to flood the lime slaker 15 with the acid solution. The water entering the lime slaker 15 in order to accomplish the acid wash can be under sufficient pressure to suit varied condition, and can be applied with variations in pressure, to provide a scouring system along with the solvent or acid, to aid in the cleaning of the entire system. In this regard, the entire system can include not only any of the lime slaker, aging tank and grit separation device, but also the various piping, including the lines 30, 61, the pump 62, 63, and dosing sub-systems, including the extraction line 76, valve 77, grit trap 78, line 80, magnetic flowmeter 81 and pinch valve 82 of FIG. 1, and, alternatively, the line 63, extraction line 76, valve 77, grit trap 78, line 80, magnetic flowmeter 81 and metering pump 82" of FIG. 1A. After the acid wash cycle, either a batch of lime slurry or water can be used to flush the system so that slaking can begin again in the cleaned system. This acid wash system enables the slaking system to run smoothly and provides adequate flow of the slurry in the system's conduits. If the acid wash cycle is to be automatically triggered, it can be set to start at certain times, or after a certain number of slaking cycles, or by measuring the build-up of scale by use of the load cells instead of the monitors 100, 101 and 122. In the case of using the load cell, the system utilizes a system wherein the weight of scale is calculated and when a critical mass is reached, the acid wash cycle is triggered.

The automatic acid washing system of this invention is thus able to use a solvent such as an acid where the lime slaker, the slurry aging tank, and the remainder of the delivery system, including the grit separation device can be neutralized and whereby any scale build-up can be dissolved. The quantity of scale that is present in each batch being treated in the slaking apparatus of this invention, being monitored by the monitors 100, 101 and 122 can be recorded in the computer 18, and when the level of scale build-up reaches a predetermined set point, or alternatively, on a periodic basis, a rinse cycle can be initiated whereby acid can be added to the lime slaking tank 15, either manually through the access opening 103 thereof, or automatically from the above-described acid feed into the access opening 103, and whereby water is added to the lime slaker 15 as described above, at a level above the liquid levels in the lime slaker, the aging tank, and the separation device, in such a manner that the entire contents of all of the equipment are totally rinsed by feeding the acid/water through spray nozzles throughout the system, as described above. The rinse solution in the lime slaking apparatus 15 can be discharged into the slurry aging tank 28 and the process can be repeated before the rinse solution is introduced into the delivery system. The delivery system can be cleaned by dosing a predetermined, variable and precise quantity of solvent solution into the potable water treatment process. The flow rate or rates of dosing, as addressed in the description above with respect to FIG. 2, can be the same, or variable, and such can be monitored and such information can be fed back to the computer control 18, or to a manual control, if desired. Thus, while it is known that lime produces scaling in the apparatus that handles the same, the scale can be removed to increase the reliability of the system, by measuring scale build-up and removing the same upon the scale build-up reaching a predetermined level, or periodically based upon a timed repeat scale-removal system. The system also sprays the acid/water solution throughout the equipment above the liquid level in the various lime slaker 15, aging tank 28, and separation device 64, as described above, with the acid/water solution also being run through the loop 63, and dosed at any of various controlled rates into the water supply, either with or without increasing the pH of the acid solution by adding a batch of supersaturated lime solution into the slurry aging tank.

It will be understood that various modifications may be made to the system, including its method steps and apparatus, and its operation, all within the spirit and scope of the invention as defined in the appended claims.

What is claimed is:

1. A lime slaking system that comprises any of:
   (a) a lime slaker in which lime and water are provided to produce an exothermic reaction resulting in a SLS;
   (b) a slurry aging tank for receiving SLS from the lime slaker; and
   (c) a grit separation device for receiving SLS and separating grit particles therefrom;
   wherein any of the slaker aging tank and grit separation device have liquid level(s) therein, the system including means for dissolving scale on interior surfaces of any of the slaker, aging tank grit separation device, piping and dosing sub-systems including an acid inlet opening into the system and means for introducing rinse water into any of the lime slaker, aging tank and grit separation device above the liquid level(s).

2. The system of claim 1, wherein the inlet opening is in the lime slaker, and means are provided for introducing rinse water into each of the lime slaker, aging tank and grit separation device above their respective liquid levels.

3. The system of claim 2, wherein the means for introducing rinse water is via spray nozzles in upper ends of each of the lime slaker, aging tank and grit separation device.

4. The system of claim 2, including means for monitoring the level of scale buildup in each of the lime slaker, the aging tank and the grit separation device and means for initiating the scale dissolving process when scale buildup reaches a predetermined level.

5. The system of claim 4, wherein the means for controlling the scale dissolving is via a programmable logic computer.

6. A pressurized delivery system comprising a system that is substantially closed to atmosphere, and including a lime slurry aging tank, a first discharge line therefrom, a pump connected to the first discharge line, a second discharge line between the pump and a dosing location, and including valve means for maintaining a substantially constant pressure through the system, including piping between the aging tank, a grit trap, a magnetic flow meter and a pinch valve or metering pump.

7. Apparatus for slaking lime comprising:
   (a) means providing calcium oxide and grit particles to a lime slaker;
   (b) means providing water that is initially at an ambient temperature to a lime slaker; the means providing water being a water jacket on the lime slaker for heating water therein from the exothermic reaction and means delivering the thus heated water to the lime slaker
   (c) a lime slaker for allowing a chemical reaction to initiate therein, comprising means for calcium oxide and water to combine to produce calcium hydroxide and heat in an exothermic reaction in the lime slaker;
   (d) means for capturing heat of hydration from the exothermic reaction and using it to preheat water that is initially at an ambient temperature that is being provided to the lime slaker, to an elevated temperature, to increase the amount of lime present in the water to a SLS level and allowing the chemical reaction to run to completion as a lime slurry while continuing to preheat the water to produce a lime slurry;
   (e) means for cooling the SLS by adding an ambient water to the lime slurry; and
   (f) a separation device and means delivering the SLS to the separation device for separating grit particles from the SLS.

8. The apparatus of claim 7, further comprising means for delivering the lime slurry from the like slaker to a slurry aging tank and means for further cooling the lime slurry.

9. The apparatus of claim 8, wherein the means for further cooling is a water jacket on the slurry aging tank and means for providing water at an ambient temperature to the water jacket on the slurry aging tank.

10. The apparatus of claim 7, wherein the separation device is a gravity-operative grit classifier device.

11. The apparatus of claim 7, further comprising means for initially preheating the water provided to the lime slaker by means other than from the chemical reaction to produce calcium hydroxide.

12. The apparatus of claim 7, further comprising a plurality of dosing discharge locations and a delivery line for delivering the SLS to the plurality of dosing locations.

13. The apparatus of claim 7, further comprising a plurality of dosing discharge locations and a delivery line for delivering the SLS to the plurality of dosing locations.

14. The apparatus of claim 7, further comprising baffle plate(s) in the separation device and comprising means for removing particles of grit from the SLS via hydraulic separation by flowing the SLS over the baffle plate(s).

15. The apparatus of claim 14, further comprising means for adjusting the orientation of at least one baffle plate.

16. The apparatus of claim 7, further comprising means for sensing the temperature of the SLS in the lime slaker and means for controlling the amounts of lime and water added to the lime slaker to achieve a predetermined temperature over a predetermined time period while the chemical reaction is occurring.

17. The apparatus of claim 16, wherein the means for controlling is a programmable logic computer.

18. The apparatus of claim 7, wherein the means providing calcium oxide and grit particle to a lime slaker includes means for volumetrically feeding the calcium oxide and grit particles to the lime slaker.

\* \* \* \* \*